(12) United States Patent
Dunn

(10) Patent No.: US 10,203,248 B2
(45) Date of Patent: Feb. 12, 2019

(54) ELECTRO-OPTIC TERAHERTZ DETECTOR

(71) Applicant: UNIVERSITY COURT OF THE UNIVERSITY OF ST ANDREWS, St Andrews Fife (GB)

(72) Inventor: Malcolm Harry Dunn, St Andrews Fife (GB)

(73) Assignee: UNIVERSITY COURT OF THE UNIVERSITY OF ST ANDREWS, St Andrews (GB)

( * ) Notice: Subject to any disclaimer, the term of this patent is extended or adjusted under 35 U.S.C. 154(b) by 0 days.

(21) Appl. No.: 15/562,529

(22) PCT Filed: Mar. 29, 2016

(86) PCT No.: PCT/GB2016/050866
§ 371 (c)(1),
(2) Date: Sep. 28, 2017

(87) PCT Pub. No.: WO2016/156821
PCT Pub. Date: Oct. 6, 2016

(65) Prior Publication Data
US 2018/0087965 A1 Mar. 29, 2018

(30) Foreign Application Priority Data
Mar. 30, 2015 (GB) .................................. 1505463.8

(51) Int. Cl.
*G01J 3/42* (2006.01)
*G01J 1/42* (2006.01)
*G01J 1/04* (2006.01)
*G01J 3/02* (2006.01)
*G02B 5/08* (2006.01)

(52) U.S. Cl.
CPC ............... *G01J 3/42* (2013.01); *G01J 1/0429* (2013.01); *G01J 1/4257* (2013.01); *G01J 3/0224* (2013.01); *G02B 5/08* (2013.01); *G01J 2003/423* (2013.01); *G01J 2003/425* (2013.01)

(58) Field of Classification Search
CPC .................................. G01J 3/42; G01J 3/0224
See application file for complete search history.

(56) References Cited

U.S. PATENT DOCUMENTS
2006/0214114 A1   9/2006 Liu et al.

FOREIGN PATENT DOCUMENTS
JP    2005265793 A    9/2005
JP    2008157633 A    7/2008
JP    2010210991 A    9/2010

OTHER PUBLICATIONS

International Search Report and Written Opinion for PCT/GB2016/050866 dated Jul. 20, 2016.

(Continued)

*Primary Examiner* — Hugh H Maupin
(74) *Attorney, Agent, or Firm* — Moore & Van Allen PLLC; W. Kevin Ransom

(57) ABSTRACT

An electro-optic detector for detecting terahertz radiation comprising an electro-optic material through which the terahertz radiation passes; a probe for transmitting probe radiation into the electro-optic material; an optical arrangement for causing the probe radiation to make multiple passes through the electro-optic material and a radiation detector for detecting the probe radiation after the multiple passes are made.

9 Claims, 4 Drawing Sheets

(56) References Cited

OTHER PUBLICATIONS

International Preliminary Report on Patentability and Written Opinion from the Intellectual Property Office of UK for PCT/GB2016/050866 dated Jul. 20, 2016.
International Search Report from the Intellectual Property Office of UK for PCT/GB2016/050866 dated Jul. 20, 2016.

ELECTRO-OPTIC TERAHERTZ DETECTOR

CROSS-REFERENCE TO RELATED APPLICATION(S)

This application is a national stage application (filed under 35 § U.S.C. 371) of PCT/GB2016/050866, filed Mar. 29, 2016 of the same title, which, in turn claims priority to Great Britain Application No. 1505463.8, filed Mar. 30, 2015 of the same title; the contents of each of which are hereby incorporated by reference.

FIELD OF THE INVENTION

The present invention relates to an electro-optic terahertz detector.

BACKGROUND OF THE INVENTION

Terahertz radiation is a form of electromagnetic radiation that in frequency or wavelength is in that part of the electromagnetic spectrum that lies between the microwave region on the low frequency side and infrared radiation on the high frequency side. A generally accepted definition of what constitutes the terahertz band of frequencies is those frequencies extending from 0.5 THz to 10 THz, where 1 THz=$10^{12}$ Hz.

Many important applications are foreseen for terahertz radiation, for example in security monitoring, non-destructive testing, process monitoring, biosensors, medical hyperspectral imaging, material characterization, communications; as well as spectroscopic and imaging applications in the sciences, including the physical and bio-sciences, and engineering. However, practical sources and detectors are not yet readily available. In part, this is because electronic-based sources extend in frequency coverage up to the lower end of the terahertz range, whereas photonic sources extend downwards towards the upper end of the terahertz range.

In recent years substantial progress has been made in addressing these shortfalls. Current techniques for generating terahertz radiation include the use of quantum cascade lasers, femto-second lasers, parametric generators, and difference frequency generators. However, some of the most promising detectors rely on the electro-optic effect. The electro-optic effect arises when an electric field is applied to a suitable material to change its optical properties, in particular inducing birefringence in the material. For the linear electro-optic or Pockels effect, the one under consideration herein, the change in refractive index and hence the birefringence induced in the material, is linearly proportional to the inducing electric field. Such changes can be measured by propagating a probe beam through the electro-optic medium and measuring changes in its polarization state. When the inducing electric field is the electric field of the terahertz radiation itself, the change thereby measured is directly proportional to the magnitude of the electric field of the terahertz radiation.

The larger the electro-optic coefficient of the material the larger the birefringence induced in the material. In order to maximize the effect of the induced birefringence on the probe radiation, the probe radiation must be phase-matched with the terahertz radiation as they propagate through the material. Where the terahertz radiation is in the form of nanosecond pulses, this phase matching is accomplished by matching the phase velocity of the probe radiation in the electro-optic medium to the phase velocity of the terahertz radiation in this medium. This may be accomplished by suitable choice of both the electro-optic medium and the wavelength of the probe.

FIG. 1 explains this principle of phase matching. The upper trace in this figure shows the sinusoidal variation of the electric field strength of the terahertz radiation in the electro-optic medium, in particular illustrating that the direction of this electric field changes from positive to negative within each half cycle of the terahertz radiation, where λ(THz) is the wavelength and V(THz) the phase velocity of the terahertz radiation in the medium. In the lower section of the diagram, is illustrated a number of sequential wavefronts associated with the probe radiation, each separated from the next by the wavelength of the probe radiation in the electro-optic medium. These particular wavefronts are shown as being subjected at the particular identified point in the medium to the (maximum) positive (red arrow) electric field of the terahertz radiation.

In order to ensure that the illustrated wavefronts experience the maximum total induced birefringence as they propagate throughout the full length of the medium then they must continue to experience as they propagate this maximum positive electric field at all points within the medium. It will be apparent that this will be the case if the phase velocity V(probe) of the probe radiation in the medium is equal to the phase velocity V(THz) of the terahertz radiation in the medium. If on the other hand they experience an electric field that changes from positive to negative on their propagation through the medium, the birefringence induced by the positive field would be cancelled or partially cancelled by the birefringence induced by the negative field. In practice, it may not always be possible to attain perfect phase matching thereby placing an upper limit on the maximum path length over which the probe radiation can effectively interact with the terahertz radiation.

In practice, the upper limit on the path length within the electro-optic medium over which optical birefringence may be induced is caused by absorption of the terahertz radiation by the electro-optic medium. This in turn places an upper limit on the path length over which such birefringence is induced to affect the polarization state of the probe radiation. By way of example only, a widely adopted material for electro-optic detection of THz radiation is ZnTe, chosen because of its favourable combination of electro-optic, transmission and phase-matching properties. Typically both phase matching and THz wave absorption limit the thickness of the ZnTe crystal that can be used to less than 1-2 mm. On the other hand, the absorption of the radiation used to probe the electro-optic effect is a much less severe limitation and therefore not significant provided the wavelength of this radiation exceeds 600 nm.

Although electro-optic techniques are now well established for femto-second pulses of terahertz radiation and continuous-wave generation of terahertz radiation, this is not the case in the intermediate region between ultrashort pulses and continuous wave, and in particular for nanosecond pulses of terahertz radiation, since in this region the lower electric field strengths encountered cannot be readily compensated by coherent detection techniques.

SUMMARY OF THE INVENTION

According to the present invention, there is provided an electro-optic detector for detecting terahertz radiation comprising: an electro-optic material through which the terahertz radiation passes; a source of probe radiation for illuminating the electro-optic material; an optical arrangement for causing the probe radiation to make multiple passes through the electro-optic material; a combination of polarizing and analyzing optics to determine the input polarization state and monitor the output polarization state of the probe radiation; and a radiation detector for detecting the probe radiation after the multiple passes are made.

By causing the probe radiation to make multiple passes through the electro-optic material, there is provided a compact, robust and sensitive detector of terahertz radiation. This is particularly suitable for use with recently developed sources that generate pulses of widely tunable terahertz radiation with pulse durations lying in the nanosecond to microsecond range (e.g. $10^{-9}$ to $10^{-4}$ seconds). Such pulses will be referred generally to as nanosecond pulses.

According to the present invention, the optical arrangement is such that each time a particular wavefront of the probe radiation passes through the electro-optic material in the same direction as the terahertz radiation it meets the terahertz radiation at the same point in the phase cycle of the terahertz wave as on the previous transit. In this way, changes in the polarization state of the probe radiation brought about by electro-optically induced birefringence arising from the terahertz radiation are constructively and coherently combined over multiple passages of the probe radiation through the electro-optic medium.

The optical arrangement may comprise mirrors. Two mirrors may be used. These mirrors may be arranged so as to be parallel.

The optical arrangement may be such that the multiple passes of the probe radiation are brought about by zig-zagging the probe radiation through the medium. In this case, any one passage of the probe is laterally displaced from any other passage in order to allow latterly displaced entry and exit points for the probe radiation.

The zig-zagging radiation may fill a cross-sectional area within the electro-optic crystal that matches the cross-sectional area associated with the THz radiation being detected.

The probe radiation may be resonant in the cavity formed between a combination of mirrors. Two mirrors may be used such that these mirrors are arranged so as to be parallel. The mirrors may together define a Fabry-Perot type interferometer.

Combining the electro-optic technique with a coherent multi-pass or resonant detector geometry in such a way as to increase the magnitude of the change in the polarization state of the probe radiation allows the direct and hence time-resolved detection of single pulses of terahertz radiation.

BRIEF DESCRIPTION OF THE DRAWINGS

Various aspects of the invention will now be described by way of example only and with reference to the accompanying drawings, of which.

DETAILED DESCRIPTION OF THE INVENTION

Figure 1:
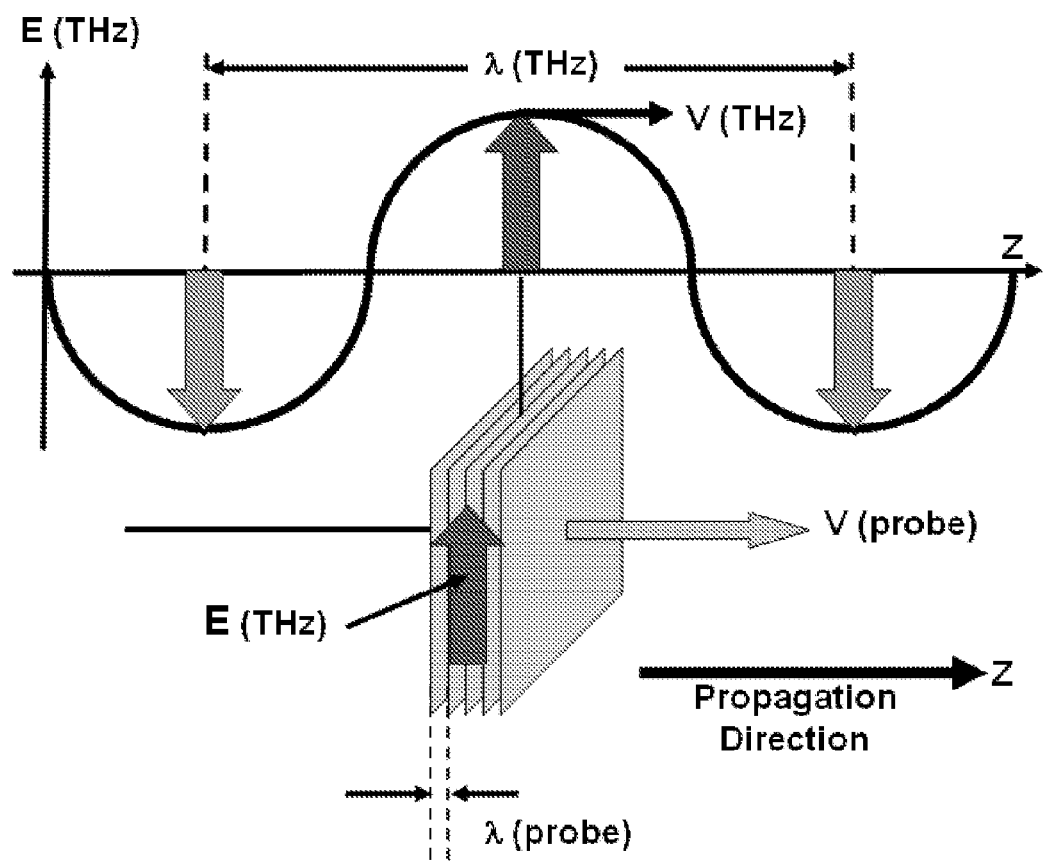
FIG. 1 is an illustration of the principle of phase matching.
Figure 2:
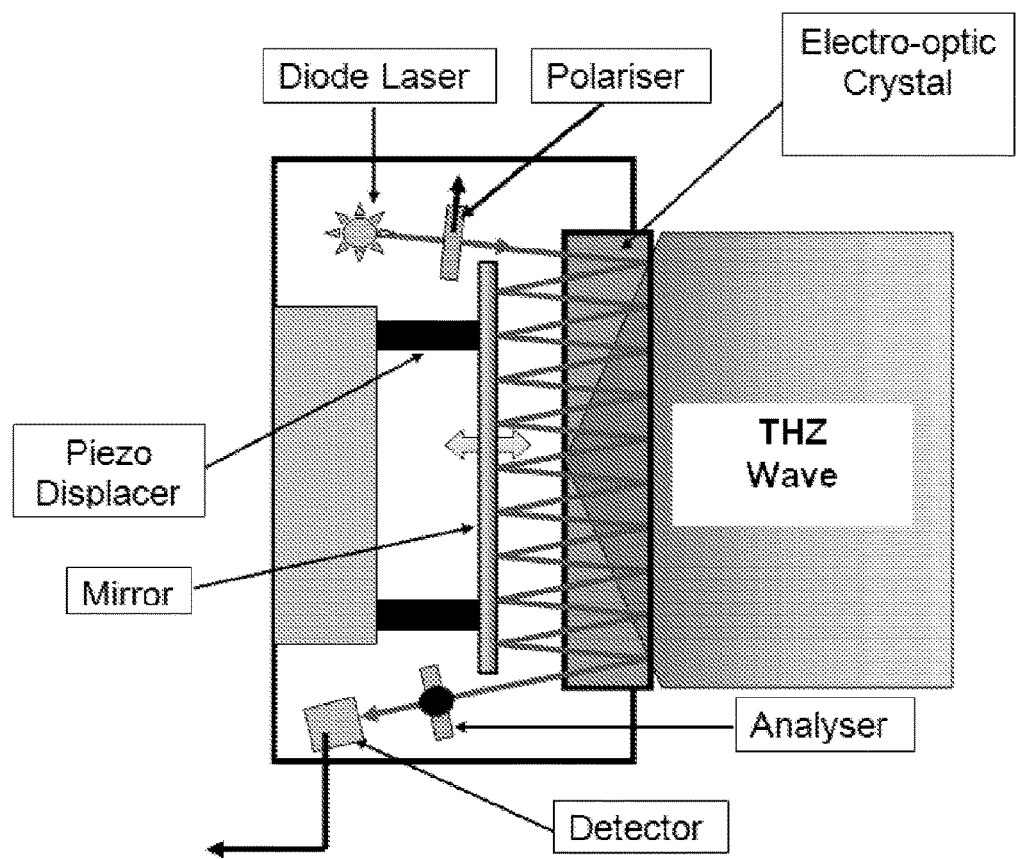
FIG. 2 is a block diagram of a first terahertz detector.

FIG. 2 shows an electro-optic terahertz detector. This has an electro-optic crystal, for example cadmium telluride or zinc telluride, which is illuminated by the terahertz wave that is to be detected. The electric field of the incident terahertz wave induces optical birefringence in the crystal through the electro-optic effect. The extent of the birefringence provides a measure of the amplitude of the incident terahertz wave.

Beyond the crystal are a mirror and a continuous wave radiation source, for example a diode laser, positioned to emit light towards the electro-optic crystal. Any suitable source may be used, but as an example it may be a laser diode with a narrow linewidth (<1 GHz) outputting 10 mW of power in the range 600-650 nm. The wavelength of the probe radiation is such that phase matching is attained between the terahertz radiation and the probe radiation when they are co-propagating through the electro-optic crystal. Light from the source passes through a polarizer, so that it is has known polarization state. It then passes through the back surface of the crystal, through the crystal and subsequently is reflected from the front surface of the crystal. From there, it passes back through the crystal and subsequently through the back surface of the crystal and onto the mirror, where it is reflected back into the crystal, this process being repeated a number of times, for example as shown in the diagram. Typically the front surface of the crystal is coated so as to reflect the probe radiation while at the same time minimizing any reflection of the terahertz wave. Typically the back surface of the crystal is coated so as to be anti-reflecting for the probe radiation. The electro-optic crystal is of a thickness that exceeds neither the coherence length associated with the phase matching nor the absorption length associated with the terahertz radiation.

The angle of incidence of the injected radiation is chosen so that it is reflected multiple times zig-zagging between the front surface of the crystal and the mirror. To ensure that the probe is exposed to as much of the THz signal as possible, the zig-zagging beam is arranged to fill a cross-sectional area within the electro-optic crystal that matches the cross-sectional area associated with the THz radiation being detected. Each passage of the probe is laterally displaced from any other passage in order to allow laterally displaced entry and exit points. At the exit end of the crystal, the probe radiation is reflected through an analyser plate, which has a known polarization response, and into a detector that is positioned at a lower end of the crystal. In this way, the probe light makes multiple passes in the region of the crystal immersed in the travelling-wave of the THz radiation.

By measuring changes in the polarization state of the probe beam using its known polarization state at the input and measuring its corresponding state after the multiple passes using the analyser/detector, a measure of the induced birefringence can be obtained. This gives a measure of the amplitude of the THz radiation. For a linear electro-optic material the change measured is directly proportional to the magnitude of the electric field of the terahertz radiation. Because the optical arrangement results in multiple passes of the probe beam, detector sensitivity is enhanced.

To attain increased sensitivity, the optical components are arranged to provide coherent and constructive addition over multiple passes of the polarization rotations (or other changes in the polarization state of the probe radiation) induced on each single pass by the electro-optic effect arising from the presence of the terahertz wave. Such constructive addition is attained by ensuring that each time the probe radiation after re-entering the electro-optic crystal and subsequently being reflected back by the front face of the crystal so as to propagate in the same direction as the terahertz radiation, then encounters the terahertz radiation at the same point in the phase cycle of the terahertz wave as on the previous passage of the probe radiation. In this way, the changes in the polarization state of the probe radiation on its passage from the front surface to the back surface of the electro-optic crystal are constructively and coherently combined over multiple passages of the probe radiation through the electro-optic medium.

Figure 3:
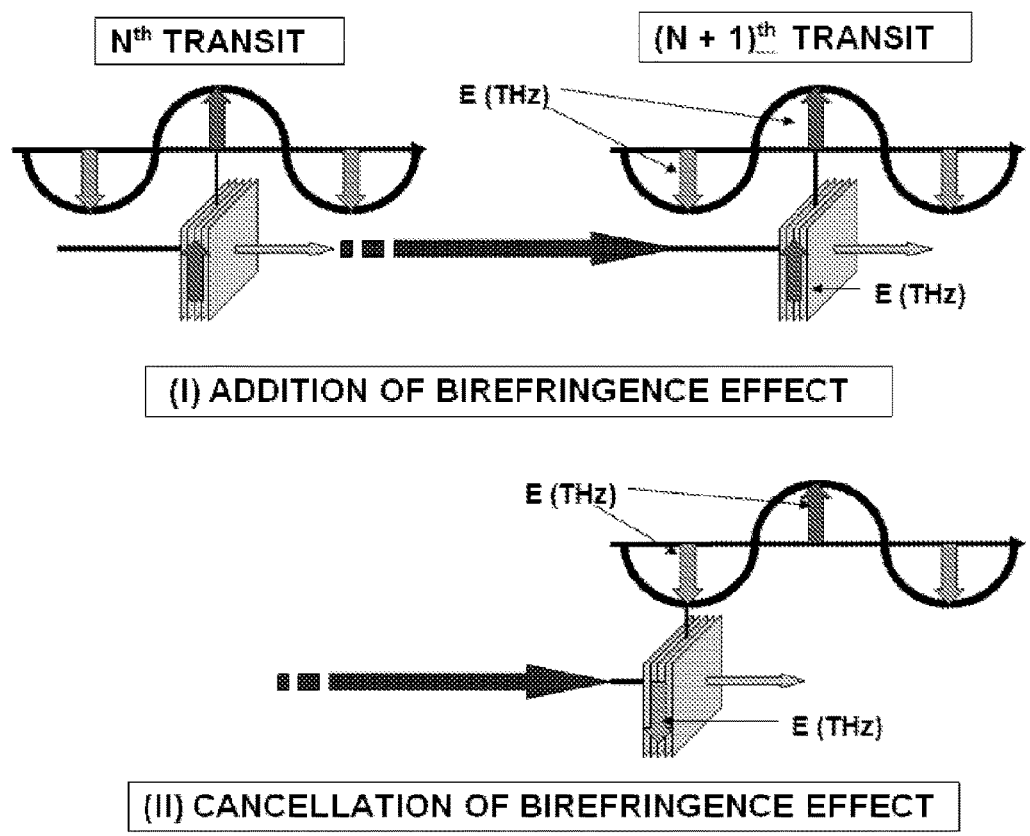
FIG. 3 illustrates phase matching within a terahertz detector.

This principle is illustrated in FIG. 3. In section (I) of this figure is illustrated the optimum condition for constructive addition of the effects of birefringence in that the particular identified wavefronts of the probe radiation under consideration meet the terahertz radiation at the some point in its phase cycle on their $(N+1)^{th}$ transit as on their $N^{th}$ transit such that they are subject to the same electric field of the terahertz radiation as on their previous transit, hence further enhancing the effects of the birefringence. On the other hand the situation illustrated in section (II) of FIG. 3 (b) is such that the wavefronts on their $(N+1)^{th}$ transit meet the terahertz radiation at a point in the phase cycle of the terahertz radiation which is $\tau$ radians out of phase with that on the $N^{th}$ transit, and as a result experience an electric field of the opposite polarity to that experienced on the previous transit. This will have the effect of cancelling on the $(N+1)^{th}$ transit the birefringence effects experienced on the $N^{th}$ transit.

It will be realized by a person versed in the current state of the art that there is still the requirement for phase matching in the multi-pass configuration as in the case of the single-pass arrangement. However, the present arrangement in addition to its other identified advantages also allows any phase errors that may have arisen during a single-pass due to imperfect phase matching to be corrected before the next pass in the multi-pass configuration.

In order to ensure that the changes in the polarization state of the probe radiation are constructively and coherently combined over multiple passages of the probe radiation through the electro-optic medium, the optical path length associated with the free-space compensating path is adjusted. This path lies between the mirror and the back face of the electro-optic crystal, and is traversed twice by the probe radiation each time before it re-enters the electro-optic medium. Path length control will be of the order of the wavelength of the terahertz radiation. Subsequent measurement of this path provides a coarse measure of the mean wavelength of the THz radiation. Because the overall transit time of the probe radiation is short from original entry to final exit from the electro-optic crystal, this allows sub-nanosecond temporal resolution of the pulse envelope.

When the probe radiation is propagating in the opposite direction to the propagation direction of the terahertz radiation, i.e. from left to right in FIG. 2, then it experiences no additional net change in its polarization state due to the electro-optic effect induced by the terahertz radiation since on its propagation through the electro-optic material the probe radiation will experience an electric field due to the terahertz radiation that is rapidly oscillating between limiting positive and negative values so nullifying any overall additional effect due to the electro-optic effect associated with this propagation direction (i.e. the process is not phase-matched under these counter propagation conditions). On returning to the electro-optic material for subsequent passes wherein it is propagating in the same direction as the terahertz radiation, then subject to the condition stated previously, it will experience coherent addition of effects on its polarization state.

Figure 4:
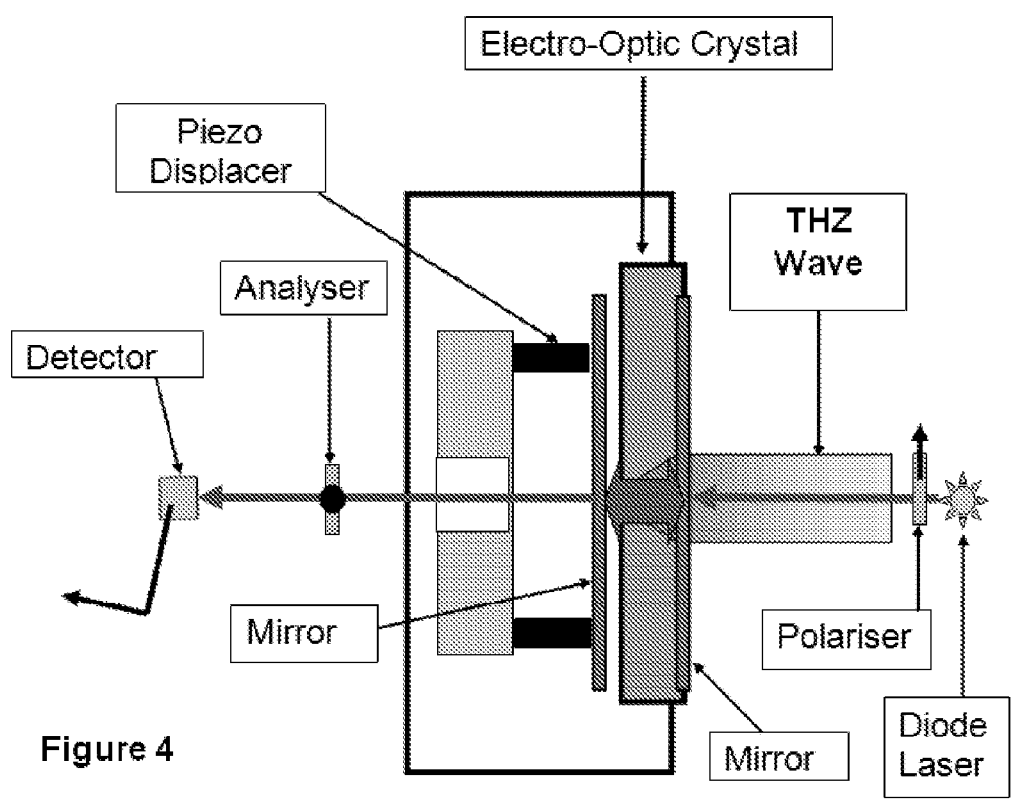
FIG. 4 is a block diagram of a second terahertz detector.

FIG. 4 shows another electro-optic terahertz detector. In this case, the electro-optic crystal is positioned between two mirrors that define a resonant cavity, for example a Fabry-Perot or equivalent resonator. The probe radiation must be resonant within the Fabry Perot resonator, so as to allow the amplitude of the probe field to build up within the resonator. For this condition to be fulfilled the probe radiation must be of a narrow spectral linewidth.

The probe beam passes through a polarizer, so that it has a known polarization state, and then is injected into the space between the mirrors in a direction substantially perpendicular to the mirror surfaces, and in the same direction as the terahertz radiation. The resonator enhances polarization rotation induced by the electro-optic effect by causing the probe beam to make multiple passes through the electro-optic crystal. In particular, the component of the probe beam that is propagating in the same direction as the terahertz radiation within the resonator experiences multiple passes of the electro-optic medium within the resonator.

To allow the probe radiation to both enter and leave the cavity, the mirrors are partially transmissive at the wavelength of the probe, and these transmissions may also be chosen to impedance match the cavity. Radiation that exits the resonant cavity passes through a polarization analyser and then a detector. As before, by measuring changes in the polarization state of the probe beam using its known polarization state at the input and measuring its corresponding state after the multiple passes through the electro-optic crystal using the analyser/detector, a measure of the induced birefringence can be obtained, and so a measure of the THz radiation.

As with the detector of FIG. 2, coherent addition of rotations or equivalent of the polarization state can be achieved if the optical arrangement is such that each time the probe radiation propagates in the same direction as the terahertz radiation, it encounters the terahertz radiation at the same point in the phase cycle of the terahertz wave. In practice, it is possible to satisfy this condition and the requirement for the probe beam to be resonant in the cavity simultaneously since the wavelength of terahertz radiation (100-300 µm) is over two orders of magnitude larger than the wavelength of the optical probe radiation (<1 µm).

The present invention provides a means by which the magnitude of the change in the polarization state of the probe radiation due to the electro-optic effect induced by the electric field of the terahertz radiation is significantly increased, thereby allowing individual pulses of terahertz radiation of nanosecond duration to be detected and for the pulse envelope to be displayed in time and thereby be recovered and measured. The invention is particularly advantageous where the radiation is generated as pulses with pulse durations lying in the nanosecond to microsecond range (e.g. $10^{-9}$ to $10^{-4}$ seconds).

A skilled person will appreciate that variations of the disclosed arrangements are possible without departing from the invention. Although the multi-pass configuration of FIG. 2 shows the probe radiation zig-zagging along a line, it could instead zig-zag so as to cover an area, for example matched to the cross-sectional area associated with the incoming terahertz radiation (e.g. similar in geometry to that associated with the well-known Heriot Cell). Further it will be appreciated that phase-matching may be fine-tuned and thereby improved by adjustment of the (small) angle, as shown in FIG. 2, between the propagation directions of the probe radiation and the terahertz radiation.

Accordingly the above description is made by way of example only and not for the purposes of limitation. It will be clear to the skilled person that minor modifications may be made without significant changes to the operation described.

The invention claimed is:

1. An electro-optic detector for detecting terahertz radiation comprising:
    an electro-optic material through which the terahertz radiation passes;
    a source of probe radiation for illuminating the electro-optic material;
    an optical arrangement for causing the probe radiation to make multiple passes through the electro-optic material;
    a combination of polarizing and analyzing optics; and
    a radiation detector for detecting the probe radiation after the multiple passes are made,
    wherein the polarizing optics are configured to determine the input polarization state, and the analyzing optics and the radiation detector are together configured to monitor the output polarization state of the probe radiation after the multiple passes through the electro-optic material are made, and
    wherein the optical arrangement is such that each time that any particular wavefront of the probe radiation passes through the electro-optic material in the same direction as the terahertz radiation, this wavefront meets the terahertz radiation at the same point in the phase cycle of the terahertz wave as it did on its previous transit.

2. A detector as claimed in claim 1, wherein the optical arrangement comprises two mirrors.

3. A detector as claimed in claim 2, wherein the two mirrors are parallel.

4. A detector as claimed in claim 1, wherein the optical arrangement is such that the multiple passes of the probe radiation are brought about by zig-zagging the probe radiation through the electro-optic material.

5. A detector as claimed in claim 4, wherein the zig-zagging is arranged to fill a cross-sectional area within the electro-optic crystal that matches the cross-sectional area associated with the terahertz radiation being detected.

6. A detector as claimed in claim 2, wherein the probe radiation is resonant in a cavity formed between the mirrors.

7. A detector as claimed in claim 6, wherein the mirrors define a Fabry-Perot type interferometer.

8. An electro-optic detector for detecting terahertz radiation comprising:
    an electro-optic material through which the terahertz radiation passes;
    a probe for transmitting probe radiation into the electro-optic material;
    an optical arrangement for causing the probe radiation to make multiple passes through the electro-optic material; and
    a radiation detector for detecting the probe radiation after the multiple passes through the electro-optic material are made,
    wherein the optical arrangement is such that the multiple passes of the probe radiation are brought about by zig-zagging the probe radiation through the electro-optic material.

9. A detector as claimed in claim 8, wherein the zig-zagging is arranged to fill a cross-sectional area within the electro-optic crystal that matches the cross-sectional area associated with the terahertz radiation being detected.

* * * * *